United States Patent
Htoo et al.

(10) Patent No.: US 8,339,183 B2
(45) Date of Patent: Dec. 25, 2012

(54) CHARGE PUMP WITH REDUCED ENERGY CONSUMPTION THROUGH CHARGE SHARING AND CLOCK BOOSTING SUITABLE FOR HIGH VOLTAGE WORD LINE IN FLASH MEMORIES

(75) Inventors: Khin Htoo, San Jose, CA (US); Feng Pan, Fremont, CA (US); Byungki Woo, San Jose, CA (US); Trung Pham, Fremont, CA (US); Yuxin Wang, Sunnyvale, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 12/509,367

(22) Filed: Jul. 24, 2009

(65) Prior Publication Data

US 2011/0018617 A1 Jan. 27, 2011

(51) Int. Cl.
G05F 1/10 (2006.01)
(52) U.S. Cl. .......................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 3,697,860 A | 10/1972 | Baker | |
| 4,271,461 A * | 6/1981 | Hoffmann et al. | 363/60 |
| 4,511,811 A | 4/1985 | Gupta | |
| 4,583,157 A | 4/1986 | Kirsch et al. | |
| 4,636,748 A | 1/1987 | Latham | |
| 4,736,121 A | 4/1988 | Cini et al. | |
| 4,888,738 A | 12/1989 | Wong et al. | |
| 5,140,182 A | 8/1992 | Ichimura | |
| 5,168,174 A | 12/1992 | Naso et al. | |
| 5,175,706 A | 12/1992 | Edme | |
| 5,263,000 A | 11/1993 | Van Buskirk et al. | |
| 5,335,198 A | 8/1994 | Van Buskirk et al. | |
| 5,392,205 A | 2/1995 | Zavaleta | |
| 5,436,587 A * | 7/1995 | Cernea | 327/536 |
| 5,483,434 A | 1/1996 | Seesink | |
| 5,508,971 A | 4/1996 | Cernea et al. | |

(Continued)

FOREIGN PATENT DOCUMENTS

DE 10 2007 026290 A1 7/2008

(Continued)

OTHER PUBLICATIONS

Feng Pan et al., "Charge Pump Circuit Design", McGraw-Hill, 2006, 26 pages.

(Continued)

Primary Examiner — Thomas J Hiltunen
(74) Attorney, Agent, or Firm — Davis Wright Tremaine LLP

(57) ABSTRACT

A charge pump circuit for generating an output voltage is described. Charge pump circuits typically have two branches. As the clocks supplying the branches of a charge pump circuit alternate, the output of each branch will alternately provide an output voltage, which are then combined to form the pump output. The techniques described here allow charge to be transferred between the two branches, so that as the capacitor of one branch discharges, it is used to charge up the capacitor in the other branch. An exemplary embodiment using a voltage doubler-type of circuit, with the charge transfer between the branches accomplished using a switch controller by a boosted version of the clock signal, which is provided by a one-sided voltage doubler.

8 Claims, 5 Drawing Sheets

U.S. PATENT DOCUMENTS

| | | | |
|---|---|---|---|
| 5,521,547 A * | 5/1996 | Tsukada | 327/537 |
| 5,563,779 A | 10/1996 | Cave et al. | |
| 5,563,825 A | 10/1996 | Cernea et al. | |
| 5,568,424 A | 10/1996 | Cernea et al. | |
| 5,570,315 A | 10/1996 | Tanaka et al. | |
| 5,592,420 A | 1/1997 | Cernea et al. | |
| 5,596,532 A | 1/1997 | Cernea et al. | |
| 5,602,794 A | 2/1997 | Javanifard et al. | |
| 5,621,685 A | 4/1997 | Cernea et al. | |
| 5,625,544 A | 4/1997 | Kowshik et al. | |
| 5,693,570 A | 12/1997 | Cernea et al. | |
| 5,732,039 A | 3/1998 | Javanifard et al. | |
| 5,734,286 A | 3/1998 | Takeyama et al. | |
| 5,767,735 A | 6/1998 | Javanifard et al. | |
| 5,781,473 A | 7/1998 | Javanifard et al. | |
| 5,801,987 A | 9/1998 | Dinh | |
| 5,818,766 A | 10/1998 | Song | |
| 5,828,596 A | 10/1998 | Takata et al. | |
| 5,903,495 A | 5/1999 | Takeuchi et al. | |
| 5,943,226 A * | 8/1999 | Kim | 363/60 |
| 5,945,870 A | 8/1999 | Chu et al. | |
| 5,969,565 A | 10/1999 | Naganawa | |
| 5,973,546 A | 10/1999 | Le et al. | |
| 5,982,222 A | 11/1999 | Kyung | |
| 6,008,690 A * | 12/1999 | Takeshima et al. | 327/534 |
| 6,018,264 A | 1/2000 | Jin | |
| 6,023,187 A | 2/2000 | Camacho et al. | |
| 6,026,002 A | 2/2000 | Viehmann | |
| 6,104,225 A | 8/2000 | Taguchi et al. | |
| 6,107,862 A | 8/2000 | Mukainakano et al. | |
| 6,134,145 A | 10/2000 | Wong | |
| 6,151,229 A | 11/2000 | Taub et al. | |
| 6,154,088 A * | 11/2000 | Chevallier et al. | 327/536 |
| 6,188,590 B1 | 2/2001 | Chang et al. | |
| 6,198,645 B1 | 3/2001 | Kotowski et al. | |
| 6,208,198 B1 | 3/2001 | Lee | |
| 6,249,445 B1 | 6/2001 | Sugasawa | |
| 6,249,898 B1 | 6/2001 | Koh et al. | |
| 6,285,622 B1 | 9/2001 | Haraguchi et al. | |
| 6,297,687 B1 | 10/2001 | Sugimura | |
| 6,307,425 B1 | 10/2001 | Chevallier et al. | |
| 6,314,025 B1 | 11/2001 | Wong | |
| 6,320,428 B1 | 11/2001 | Atsumi et al. | |
| 6,320,796 B1 | 11/2001 | Voo et al. | |
| 6,329,869 B1 | 12/2001 | Matano | |
| 6,344,959 B1 | 2/2002 | Milazzo | |
| 6,344,984 B1 | 2/2002 | Miyazaki | |
| 6,359,798 B1 * | 3/2002 | Han et al. | 363/60 |
| 6,369,642 B1 | 4/2002 | Zeng et al. | |
| 6,370,075 B1 | 4/2002 | Haeberli et al. | |
| 6,400,202 B1 | 6/2002 | Fifield et al. | |
| 6,404,274 B1 | 6/2002 | Hosono et al. | |
| 6,424,570 B1 | 7/2002 | Le et al. | |
| 6,445,243 B2 | 9/2002 | Myono | |
| 6,456,170 B1 | 9/2002 | Segawa et al. | |
| 6,476,666 B1 * | 11/2002 | Palusa et al. | 327/536 |
| 6,486,728 B2 | 11/2002 | Kleveland | |
| 6,518,830 B2 | 2/2003 | Gariboldi et al. | |
| 6,525,614 B2 | 2/2003 | Tanimoto | |
| 6,525,949 B1 | 2/2003 | Johnson et al. | |
| 6,531,792 B2 | 3/2003 | Oshio | |
| 6,538,930 B2 | 3/2003 | Ishii et al. | |
| 6,545,529 B2 * | 4/2003 | Kim | 327/536 |
| 6,556,465 B2 | 4/2003 | Wong et al. | |
| 6,577,535 B2 | 6/2003 | Pasternak | |
| 6,606,267 B2 | 8/2003 | Wong | |
| 6,724,241 B1 | 4/2004 | Bedarida et al. | |
| 6,734,718 B1 | 5/2004 | Pan | |
| 6,760,262 B2 | 7/2004 | Haeberli et al. | |
| 6,781,440 B2 * | 8/2004 | Huang | 327/537 |
| 6,798,274 B2 | 9/2004 | Tanimoto | |
| 6,801,454 B2 | 10/2004 | Wang et al. | |
| 6,819,162 B2 | 11/2004 | Pelliconi | |
| 6,834,001 B2 | 12/2004 | Myono | |
| 6,859,091 B1 | 2/2005 | Nicholson et al. | |
| 6,878,981 B2 | 4/2005 | Eshel | |
| 6,891,764 B2 | 5/2005 | Li | |
| 6,894,554 B2 | 5/2005 | Ito | |
| 6,922,096 B2 | 7/2005 | Cernea | |
| 6,927,441 B2 | 8/2005 | Pappalardo et al. | |
| 6,933,768 B2 | 8/2005 | Hausmann | |
| 6,944,058 B2 | 9/2005 | Wong | |
| 6,975,135 B1 | 12/2005 | Bui | |
| 6,990,031 B2 | 1/2006 | Hashimoto et al. | |
| 6,995,603 B2 * | 2/2006 | Chen et al. | 327/536 |
| 7,002,381 B1 | 2/2006 | Chung | |
| 7,023,260 B2 | 4/2006 | Thorp et al. | |
| 7,030,683 B2 | 4/2006 | Pan et al. | |
| 7,113,023 B2 | 9/2006 | Cernea | |
| 7,116,154 B2 * | 10/2006 | Guo | 327/536 |
| 7,116,155 B2 | 10/2006 | Pan | |
| 7,120,051 B2 | 10/2006 | Gorobets et al. | |
| 7,129,759 B2 | 10/2006 | Fukami | |
| 7,135,910 B2 | 11/2006 | Cernea | |
| 7,135,911 B2 * | 11/2006 | Imamiya | 327/536 |
| 7,208,996 B2 | 4/2007 | Suzuki et al. | |
| 7,224,591 B2 | 5/2007 | Kaishita et al. | |
| 7,227,780 B2 | 6/2007 | Komori et al. | |
| 7,239,192 B2 | 7/2007 | Tailliet | |
| 7,253,676 B2 | 8/2007 | Fukada et al. | |
| 7,259,612 B2 * | 8/2007 | Saether | 327/536 |
| 7,276,960 B2 | 10/2007 | Peschke | |
| 7,279,957 B2 | 10/2007 | Yen | |
| 7,345,335 B2 * | 3/2008 | Watanabe | 257/314 |
| 7,345,928 B2 | 3/2008 | Li | |
| 7,368,979 B2 | 5/2008 | Govindu et al. | |
| 7,372,320 B2 | 5/2008 | Pan | |
| 7,397,677 B1 | 7/2008 | Collins et al. | |
| 7,436,241 B2 * | 10/2008 | Chen et al. | 327/536 |
| 7,440,342 B2 | 10/2008 | Pan | |
| 7,443,735 B2 | 10/2008 | Pan | |
| 7,463,521 B2 | 12/2008 | Li | |
| 7,468,628 B2 | 12/2008 | Im et al. | |
| 7,495,500 B2 | 2/2009 | Al-Shamma et al. | |
| 7,521,978 B2 * | 4/2009 | Kim et al. | 327/291 |
| 7,554,311 B2 | 6/2009 | Pan | |
| 7,579,903 B2 | 8/2009 | Oku | |
| 7,671,572 B2 | 3/2010 | Chung | |
| 7,696,812 B2 | 4/2010 | Al-Shamma et al. | |
| 7,772,914 B2 * | 8/2010 | Jung | 327/390 |
| 7,795,952 B2 | 9/2010 | Lui et al. | |
| 7,956,673 B2 | 6/2011 | Pan | |
| 7,969,235 B2 | 6/2011 | Pan | |
| 7,973,592 B2 | 7/2011 | Pan | |
| 2002/0008566 A1 | 1/2002 | Taito et al. | |
| 2002/0014908 A1 * | 2/2002 | Lauterbach | 327/536 |
| 2002/0075706 A1 | 6/2002 | Foss et al. | |
| 2002/0130701 A1 | 9/2002 | Kleveland | |
| 2002/0140463 A1 | 10/2002 | Cheung | |
| 2003/0128560 A1 | 7/2003 | Saiki et al. | |
| 2003/0214346 A1 | 11/2003 | Pelliconi | |
| 2004/0046603 A1 | 3/2004 | Bedarida et al. | |
| 2005/0093614 A1 | 5/2005 | Lee | |
| 2005/0195017 A1 | 9/2005 | Chen et al. | |
| 2005/0237103 A1 | 10/2005 | Cernea | |
| 2005/0248386 A1 | 11/2005 | Pan et al. | |
| 2006/0098505 A1 | 5/2006 | Cho et al. | |
| 2006/0114053 A1 | 6/2006 | Sohara et al. | |
| 2006/0244518 A1 * | 11/2006 | Byeon et al. | 327/536 |
| 2006/0250177 A1 | 11/2006 | Thorp et al. | |
| 2007/0001745 A1 | 1/2007 | Yen | |
| 2007/0053216 A1 | 3/2007 | Alenin | |
| 2007/0069805 A1 | 3/2007 | Choi et al. | |
| 2007/0126494 A1 | 6/2007 | Pan | |
| 2007/0139099 A1 | 6/2007 | Pan | |
| 2007/0139100 A1 | 6/2007 | Pan | |
| 2007/0211502 A1 | 9/2007 | Komiya | |
| 2007/0212502 A1 | 9/2007 | Hansborough | |
| 2007/0222498 A1 | 9/2007 | Choy et al. | |
| 2007/0229149 A1 | 10/2007 | Pan et al. | |
| 2008/0012627 A1 * | 1/2008 | Kato | 327/536 |
| 2008/0024096 A1 | 1/2008 | Pan | |
| 2008/0042731 A1 | 2/2008 | Daga et al. | |
| 2008/0111604 A1 | 5/2008 | Boerstler et al. | |
| 2008/0116963 A1 * | 5/2008 | Jung | 327/537 |
| 2008/0157852 A1 | 7/2008 | Pan | |
| 2008/0157859 A1 | 7/2008 | Pan | |

| | | |
|---|---|---|
| 2008/0198662 A1 | 8/2008 | Mokhlesi |
| 2008/0218134 A1 | 9/2008 | Kawakami et al. |
| 2008/0239802 A1 | 10/2008 | Thorp |
| 2008/0239856 A1 | 10/2008 | Thorp |
| 2008/0278222 A1 | 11/2008 | Conti et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0063918 A1 | 3/2009 | Chen et al. |
| 2009/0091366 A1 | 4/2009 | Baek et al. |
| 2009/0121780 A1* | 5/2009 | Chen et al. ............... 327/536 |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Raghavan |
| 2009/0174441 A1 | 7/2009 | Gebara et al. |
| 2009/0219077 A1 | 9/2009 | Pietri et al. |
| 2009/0296488 A1 | 12/2009 | Nguyen et al. |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0074034 A1 | 3/2010 | Cazzaniga |
| 2010/0085794 A1 | 4/2010 | Chen et al. |
| 2010/0244935 A1* | 9/2010 | Kim et al. ............... 327/536 |
| 2011/0133820 A1 | 6/2011 | Pan |
| 2011/0148509 A1 | 6/2011 | Pan |

FOREIGN PATENT DOCUMENTS

| | | |
|---|---|---|
| EP | 0 382 929 A | 8/1990 |
| EP | 0 780 515 A | 6/1997 |
| JP | 2007-020268 A | 1/2007 |
| WO | 01/06336 A1 | 1/2001 |
| WO | 2006/132757 A | 12/2006 |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

U.S. Patent Application entitled "Charge Pump with Vt Cancellation Through Parallel Structure," filed Jun. 9, 2008, 18 pages.

U.S. Appl. No. 12/973,641, filed Dec. 20, 2010, 26 pages.

U.S. Appl. No. 12/973,493, filed Dec. 20, 2010, 28 pages.

U.S. Appl. No. 13/228,605, filed Sep. 9, 2011, 21 pages.

* cited by examiner

Charging Half Cycle

Transfer Half Cycle

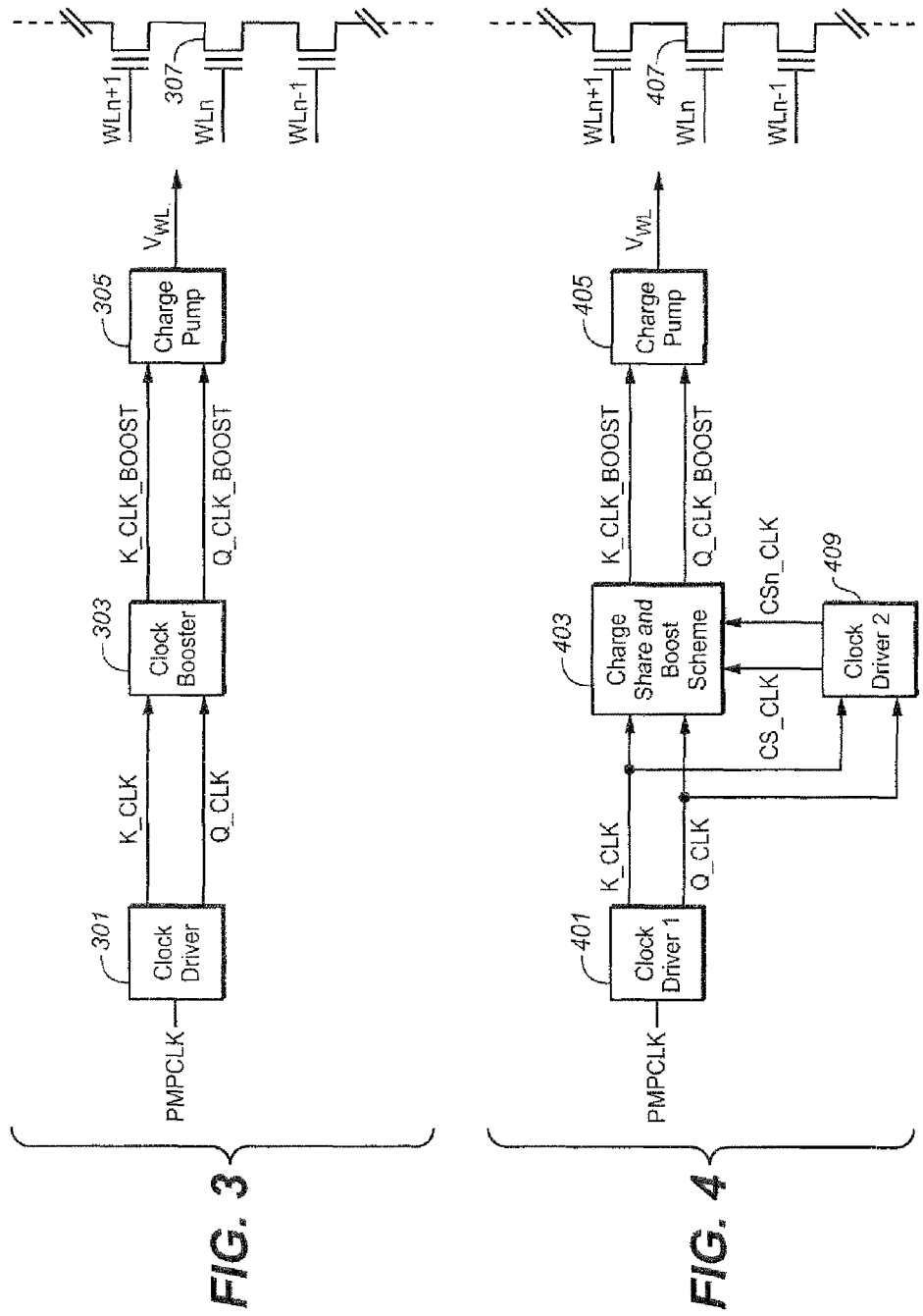

US 8,339,183 B2

CHARGE PUMP WITH REDUCED ENERGY CONSUMPTION THROUGH CHARGE SHARING AND CLOCK BOOSTING SUITABLE FOR HIGH VOLTAGE WORD LINE IN FLASH MEMORIES

FIELD OF THE INVENTION

This invention pertains generally to the field of charge pumps and more particularly to techniques for reducing power consumption in the pump.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs are know in the art. But given the common reliance upon charge pumps, there is an on going need for improvements in pump design, particularly with respect to trying to reduce the amount of layout area and the efficiency of pumps.

SUMMARY OF THE INVENTION

In a first set of aspects, a charge pump circuit is described. The charge pump includes a boosting section having a first branch receiving a first clock signal and providing a first output at a first output node, and a second branch receiving a second clock signal and providing a second output at a second node. The first and second clock signals are of opposite phase so that the first clock signal falls while the second clock signal rises and the first clock signal rises while the second clock signal falls. The charge pump circuit also includes a charge sharing circuit connected between the first and second nodes, wherein the charge sharing circuit is active when either the first or second clock signal is falling.

Other aspects present methods of operating a charge pump system. This includes receiving a clock signal and generating from it a first output waveform at a first node and a second output waveform at a second node. The first and second waveforms are boosted versions of the clock signal that are of opposite phase, so that the first node discharges while the second node charges and the first node charges while the second node discharges. Generating the first and second waveform includes transferring charge between charge between the first and second nodes when the first node charges and discharges.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which:

FIGS. 3 is a block diagram of a common arrangement for a word line bias circuit.

FIG. 4 is a block diagram for a word line bias circuit using a charge share and boost clock mechanism.

DETAILED DESCRIPTION

The techniques presented here are widely applicable to various charge pump designs for improving their performance. Charge pump circuits typically have two branches. As the clocks supplying these branches alternate, the output of each branch will alternately (ideally) provide an output voltage, which are then combined to form the pump output. The techniques described here allow charge to be transferred between the two branches, so that as the capacitor in one branch discharges, it is used to charge up the capacitor in the other branch. In the following, the description will primarily be based on an exemplary embodiment using a voltage doubler-type of circuit, but the concepts can also be applied to other pump designs. Additionally, although the embodiments are presented here primarily in the context of being used for word lines in flash type memories, they are more generally applicable to other applications.

More specifically, in applications such as for non-volatile memory usage, the capacitive loading of both selected and unselected word-lines during read, verify, and program operations is proportional to the size/area of the word-line bias charge pump (or pumps), and hence, its power consumption. As device sizes continue to shrink, this will result in devices correspondingly increasing their poser consumption. The techniques presented in the following use charge sharing and boost clocking methods to address this issue while maintaining performance. The exemplary embodiment uses a two-phase pump clock where the charge pump concurrently charges and discharges elements. The described charge sharing and boost pump clocking schemes allow the system to recycle the energy dissipated for discharging and use it for charging to save energy.

More information on prior art charge pumps, such voltage doubler type pumps and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,801,454; 6,922,096; 7,030,683; 7,135,910; 7,372,320; 7,368,979; 7,443,735; and 7,440,342; US patent publications 2007-0139099-A1 and 2008-0024096-A1; and applications Ser. Nos. 10/842,910 filed on May 10, 2004; 11/295,906 filed on Dec. 6, 2005; 11/303,387 filed on Dec. 16, 2005; 11/497,465 filed on Jul. 31, 2006; 11/523,875 filed on Sep. 19, 2006; 11/845,903 and 11/845,939, both filed Aug. 28, 2007; 11/955,221 and 11/955,237, both filed on Dec. 12, 2007; and 12/135,945, filed Jun. 9, 2008.

Figure 1A:
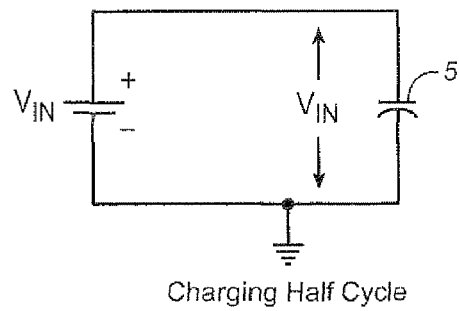
FIG. 1a is a simplified circuit diagram of the charging half cycle in a generic charge pump.
Figure 1B:
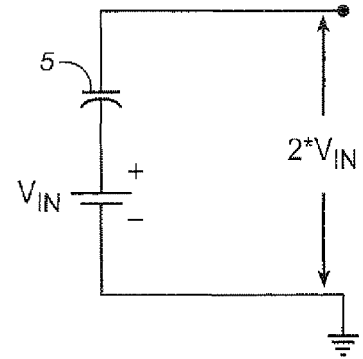
FIG. 1b is a simplified circuit diagram of the transfer half cycle in a generic charge pump.
Figure 2:
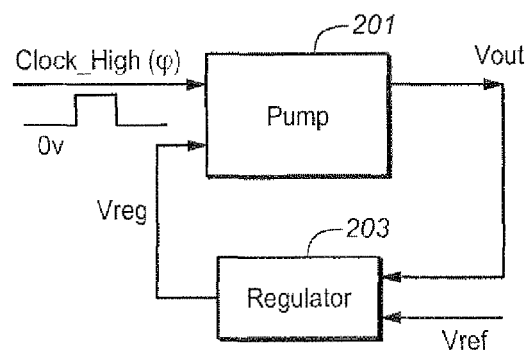
FIG. 2 is a top-level block diagram for a regulated charge pump.

FIG. 2 is a top-level block diagram of a typical charge pump arrangement. The designs described here differ from the prior art in details of how the pump section 201. As shown in FIG. 2, the pump 201 has as inputs a clock signal and a voltage Vreg and provides an output Vout. The high (Vdd) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although in some usages "charge pump" refers to just the pump section 201.) The various elements of FIG. 2 are developed further in the various references cited the preceding paragraph. For example, the following description will not further discuss the regulator 203, but various aspects related to regulation and other topics which are complementary with, and can be incorporated into, the following embodiments are described in these references.

FIG. 3 illustrates a typical arrangement for supplying clock signals to a charge pump being applied, in the example, as a word-line bias pump. In this block diagram, only the elements being discussed are explicitly shown with others, such as the regulation circuitry and elements related to the memory array suppressed for simplicity. A cock signal PMPCLK for the charge pump is supplied to a clock driver 301. From this clock signal, the driver 301 generates a pair of alternating non-overlapping clock signals K_CLK and Q_CLK, such as shown in the first three waveforms of FIG. 8, which is discussed below. The K_CLC and Q_CLK signals are then sent to a clock booster 303 to increase their amplitude from Vcc (or thereabouts) to the boosted values K_CLK_BOOST and Q_CLK_BOOST, which are then sent on to the charge pump 301. The charge pump can then generate, in this example, the word line voltage level $V_{WL}$ to apply to a selected word line, such as WLn of the representative NAND string 307. (More detail on NAND type flash memory, and other non-volatile memory structures, can be found in the following references, for example: U.S. Pat. Nos. 7,345,928, 7,463,521; or US Pat. Pub. No. 2008/0198662 A1.

There is an ongoing search for improvements in the amount of power consumed in charge pump systems. For example, in the NAND flash memory word-line bias application of FIG. 3, the power consumption is increasingly becoming detrimental due to the growing capacitive loading as memories shrink and the number of cells increase. To reduce power consumption, a clocking scheme (called "charge share and boost" in the following) is introduced, is shown in the block diagram FIG. 4.

In FIG. 4, blocks 403 and 409 are new blocks, compared with the design of FIG. 3. Clock driver 2 409 is an extra clock driver, implemented here as single-sided voltage doubler and is used to supply a high voltage charge share device inside the charge share and boost scheme block 403.

The operation of charge share and boost mechanism will now be briefly be described for the exemplary embodiments based on voltage doublers. In the arrangement of FIG. 3, pump control signals or pump clocks K_CLK and Q_CLK, which have anti-phase non-overlapping time intervals, are generated in clock driver 301 from a single pump clock, PMPCLK. They are boosted in the clock booster 303 to be twice Vcc for the signals K_CLK_BOOST and Q_CLK_BOOST signals before going into charge pump block 305. The boosted clocks are intended for better pump ramp-up time. In FIG. 4, in addition to the existing clocks K_CLK and Q_CLK from clock generator 1 401, two new clocks, CS_CLK and CSn_CLK, from clock generator 2 409 are introduced. CS_CLK is then boosted to be CS_CLK_BOOST to control the charge sharing between K_CLK_BOOST and Q_CLK_BOOST in block 403. The overall operation of the charge pump can be the same except that, now with the new mechanism, energy dissipated for discharging the charge pump capacitors can be recycled to use for charging up the capacitors of the pump in alternate states. With careful timing for the charge share intervals, the performance can remain the same.

Figure 5:
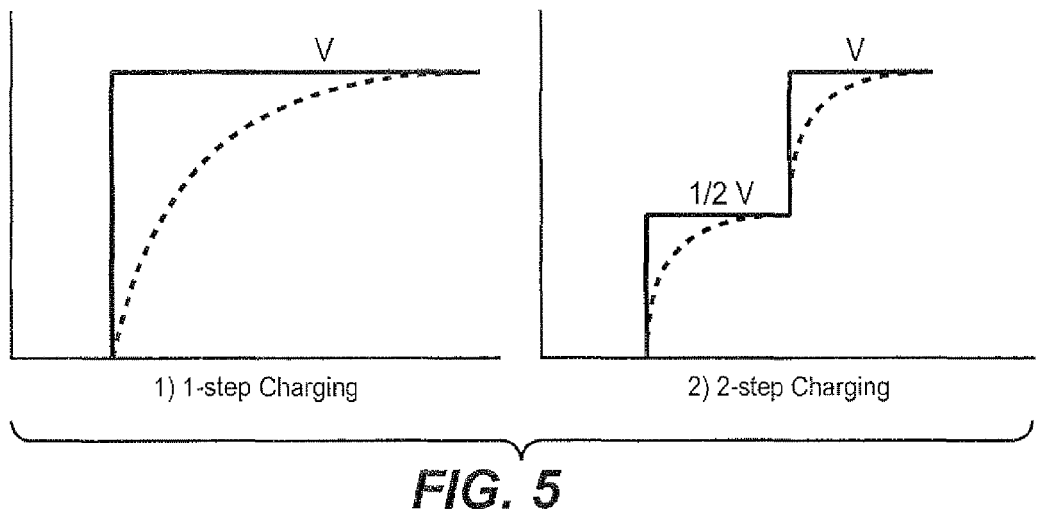
FIG. 5 is a diagram showing 1-step and 2-step charging.

Before getting into the detailed operation, it is useful to visit the basic idea behind the charge recycling. FIG. 5 shows the basic concept of 1-step charging and 2-step charging, where the dotted line shows the more realistic ramp up. In 1-step charging, energy (E) consumed by charging a capacitance C from 0 to a voltage level V is:

$$E=QV \tag{1}$$

$$Q=CV \tag{2}$$

where Q is the charge required. From (1) and (2), $$E=Cv^2 \tag{3}$$

In 2-step charging, the energy ($E_1$) consumed by charging from 0 to a voltage level ½ V is:

$$E_1=(½ Q)(½ V)=¼ QV \tag{4}$$

And, energy ($E_2$) consumed by charging from ½ V to V is:

$$E_2=½ Q V \tag{5}$$

Combining (4) and (5) gives:

$$E_1+E2=¼ QV+½ QV \tag{6}$$

From (6), if the system can recycle ¼ QV term, the total energy consumed by charging from 0 to V can be reduced to ½ $CV^2$, or half that of 1-step charging. Note that this process can be generalized in a number of ways, such as introducing more steps or using an intermediate voltage besides ½ V.

Figure 6:
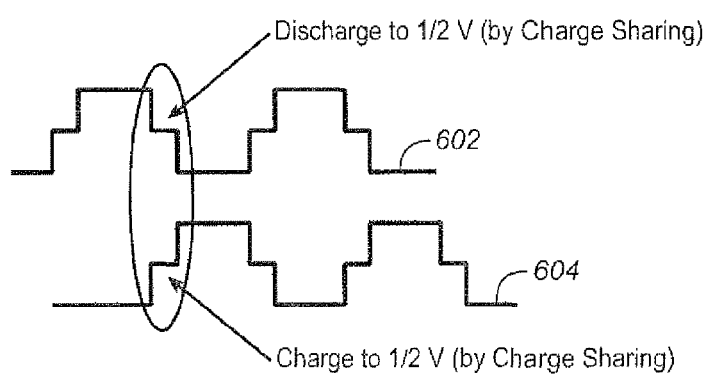
FIG. 6 shows further illustrate the charge sharing for energy savings.

In a circuit such as charge pump that uses simultaneous charging and discharging capacitors, there is a possibility to recycle the discharging energy to use for charging by charge sharing between the pump clocks. FIG. 6 illustrates that possibility. Waveforms 602 and 604 illustrates the level on the two capacitors that alternately charge and discharge using the two step process on the left of FIG. 5. In the circled region, the charge being discharged from 602 is fed to the other capacitor to charge it up as shown in 604.

Figure 7:
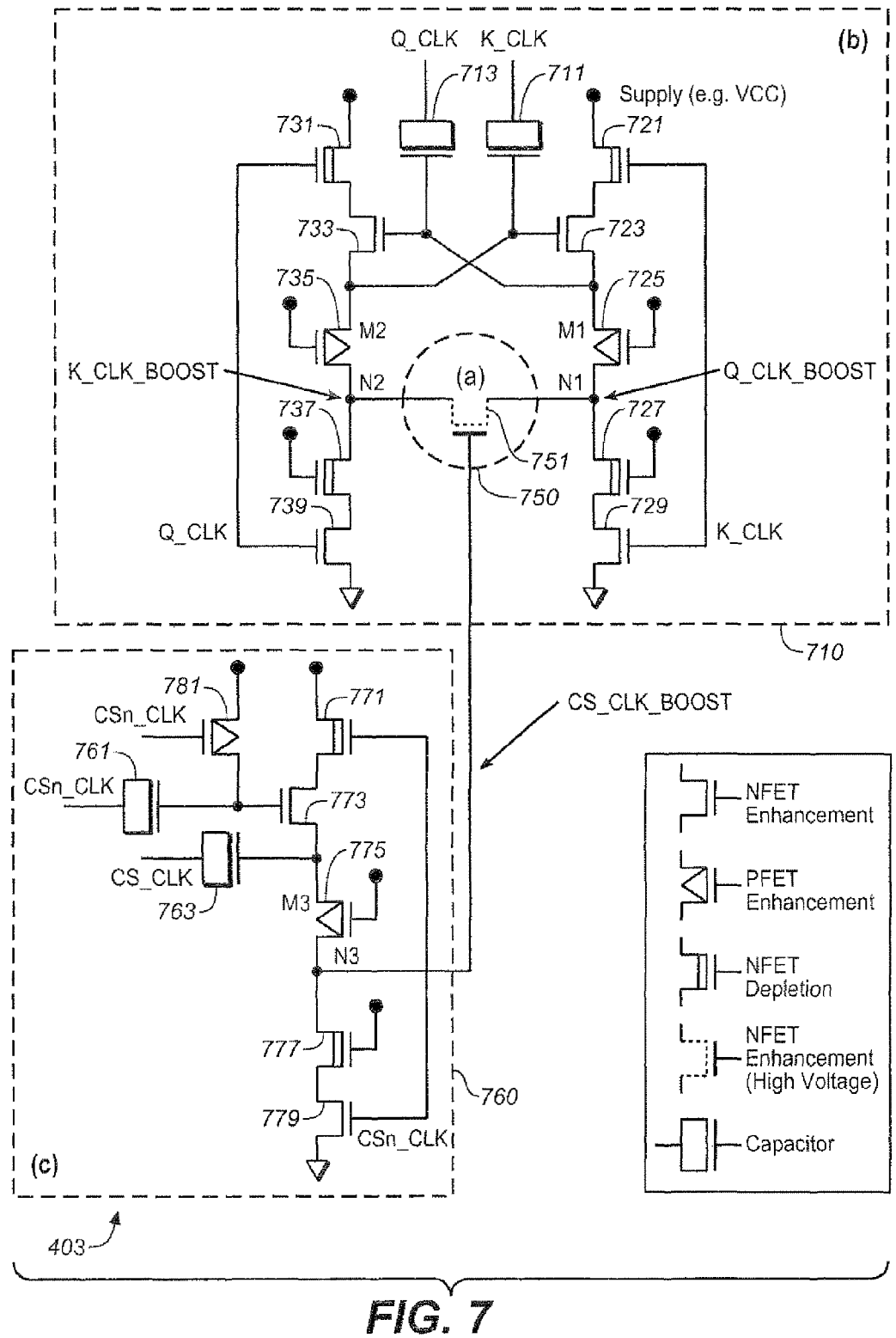
FIG. 7 is an embodiment for a charge sharing and boost circuit.
Figure 8:
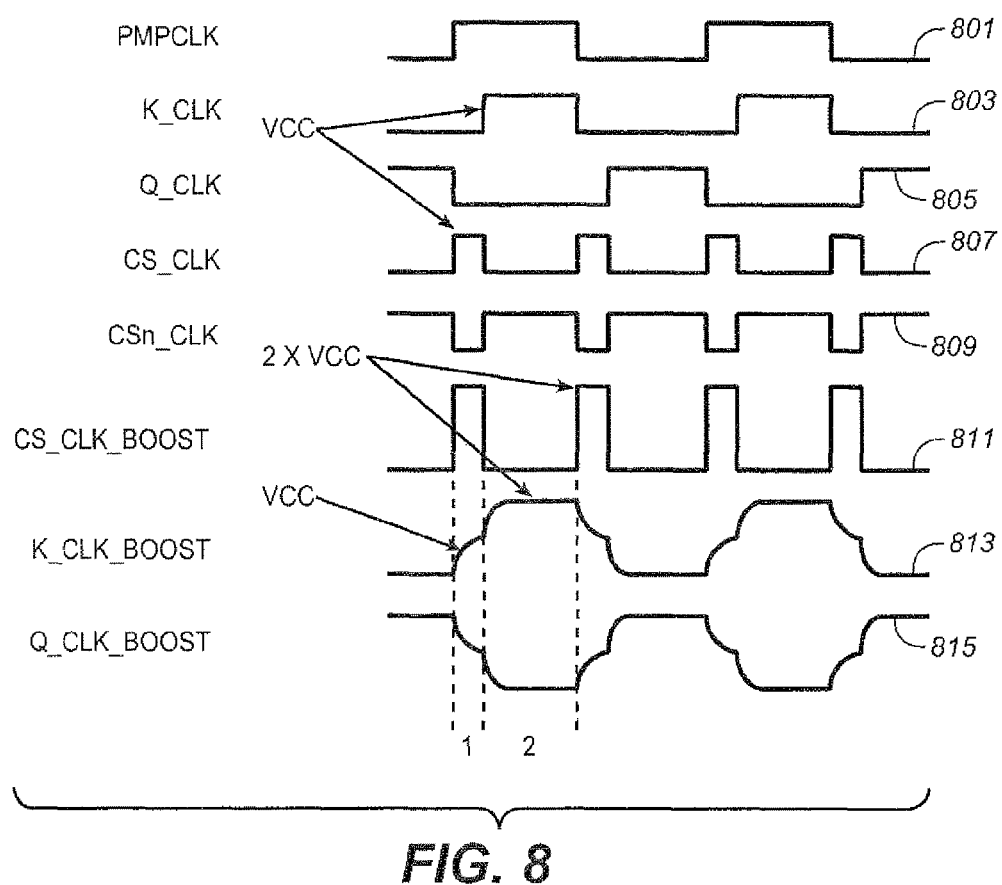
FIG. 8 shows waveforms for the circuit of FIG. 7

FIGS. 6 and 7 respectively show the circuit diagram of the charge share and boost mechanism 403 and the timing diagram of the pump controls/clocks for an exemplary embodiment. FIG. 7 is broken down into of three modules. Sub-circuit (b) 710 (not including (a) 750) is taken as a conventional voltage doubler, such as would be part of the conventional scheme for element 303 of FIG. 3. However, by adding a single-sided voltage doubler, sub-circuit (c) 760, and a charge sharing device, sub-circuit (a) 750, and a few modifications to the clocking scheme, as shown in FIG. 8, the circuit of FIG. 7 can provide power savings of word line bias generation and other charge pump applications. The operation of the exemplary embodiment for the charge share and boost circuit 403 will be described in more detail.

In FIG. 7, a key to the various symbols is given at lower right and with the connections to ground and the power supply (e.g. Vcc) conventionally represented as the arrow at the bottom and the solid circuit at top, respectively, of the various lines. Two non-overlapping, anti-phase clocks of amplitude VCC, K_CLK 803 and Q_CLK 805, are generated from a single clock PMPCLK 801 in clock driver 1 401 (FIG. 4) and their non-overlapping intervals have longer time (~25% of half clock cycle) than that of conventional non-overlapping pump clock (<5% of half clock cycle). (In this way, the signals K_CLK and Q_CLK differ between FIGS. 3 and 4.) Another set of non-overlapping, anti-phase clocks of amplitude VCC, CS_CLK 807 and CSn_CLK 809 are generated in clock driver 409 and are timed in a way that CS_CLK has positive phase during K_CLK and Q_CLK non-overlapping intervals. One should also note that CS_CLK and CSn_CLK non-overlapping intervals are similar to that of conventional pump clock, i.e., <5% of high time. The details of the clock driver circuits are not described here in detail, but can be any applicable design.

Turning to the elements of 403, sub-circuit (b) is arranged as a voltage doubler where, on the right side, transistors 721, 723, M1 725, 727, and 729 are connected in series between the supply and ground, with the control gates of the first and last of these (721, 729) connected to receive K_CLK. The left side is similarly arranged, with transistors 731., 733, M1 735, 737, and 739 connected in series between the supply and ground, but with the control gates of the first and last ones (731, 739) now connected to receive Q_CLK. The gate of 723 is connected to receive the level between 733 and 735 and the gate of 733 is connected between 723 and 725, with these lines also respectively attached to plate of capacitor 711 and of capacitor 713 as shown. The top plates of capacitors 711 and 713 respectively receive K_CLK and Q_CLK. In sub-circuit (b) 710, K_CLK and Q_CLK switch transistor M1 725 and M2 735 on and off successively in order to boost the nodes N2, supplying K_CLK_BOOST, and N1, supplying Q_CLK_BOOST, to 2×VCC. (It will be understood that actual voltage values as implemented will vary somewhat in real operation, so these should all be taken as having an implicit "substantially" attached to them.) The output is then taken from nodes N1 and N2. The exemplary embodiment shows transistors 727 and 737 included to protect the low voltage devices 729 and 739 when the nodes N1 and N2 are boosted.

Sub-circuit (c) 760 has an exemplary embodiment as basically half of a voltage doubler circuit. Transistors 771, 773, M3 775, 777, and 779 are connected in series between the power supply and ground, with the gates of 771 and 779 connected to CSn__CLK. The gate of 773 is connected to the supply through transistor 781 and to a plate of capacitor 761, where the gate of transistor 781 and top plate of capacitor 761 are both connected to CSn_CLK. Capacitor 763 is connected between 773 and M3 775 on one side and CS_CLK on the other. In sub-circuit (c) 760, CS_CLK and CSn_CLK switch transistor M3 775 on and off successively in order to boost the node N3, which supplies CS_CLK_BOOST, to 2×Vcc. Sub-circuit (a) 750 is implemented by a single high voltage NFET device 751 that enables the charge-sharing between K_CLK_BOOST and Q_CLK_BOOST.

Referring to the topology in FIG. 7, the final K_CLK_BOOST and Q_CLK_BOOST consist of two main time intervals, 1 and 2, as shown in 813 and 81 5 of FIG. 8 for the proposed charge share and boost scheme. During interval 1, sub-circuits (a) 750 and (c) 760 are active and CS_CLK_BOOST 811 is boosted up to 2×VCC and transistor 751 is on to charge share between K_CLK_BOOST 813 and Q_CLK_BOOST 815. One of the two nodes N1 and N2 is charged from 0 to VCC and the other discharged from 2×Vcc to Vcc. K_CLK 803 and Q_CLK 805 are timed so that sub-circuit (b) 710 is inactive during this interval, but only to hold the charge on nodes N1 and N2. As noted, the preferred embodiment of uses half of a voltage doubler circuit so that CS_CLK_BOOST is boosted up to 2×Vcc. As the threshold voltage Vt of the device 751 in sub-circuit (a) 750 is less than Vcc, 2×Vcc will be greater than the sum of the intermediate voltage to be transferred plus Vt, allowing for the desired charge transfer to occur.

During interval 2, sub-circuit (b) 710 boosts up K_CLK_BOOST and Q CLK_BOOST nodes N1 and N2 from Vcc (they are at Vcc level from charge sharing in interval 1), to 2×Vcc at alternate clock cycles. Sub-circuit (a) 750 and (c) 760 are inactive during interval 2. As noted above, clocks K_CLK and Q_CLK can readily be generated from a non-overlapping, two phase clock generator and CS_CLK can easily be generated with a NOR gate with K_CLK and Q_CLK as inputs. These parts are represented as Clock Driver 1 401 and Clock driver 2 409 in FIG. 4.

This results in the reduction of power consumption described above with respect to FIG. 5. The introduction of sub-circuit (c) 760 will consume some power, but this should be significantly less than the resultant savings in sub-circuit (b) 710. The energy consumed by sub-circuit (b) 710 is proportional to the capacitance the nodes N1 and N2 have to charge and discharge, which is significantly reduced, while the energy consumed by sub-circuit (c)760 is proportional to the gate capacitance of device 751, which is small compared to the capacitance the nodes N1 and N2 have to drive. As noted above with respect to FIG. 5, although the exemplary embodiment charges up to half of the final output voltage during phase 1 (from Vec to 2×Vcc), other intermediate values can used. Similarly, the charge/discharge process can use more two sub-intervals.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump circuit, comprising:
   a boosting section having a first branch receiving a first clock signal and providing a first output signal at a first output node and a second branch receiving a second clock signal and providing a second output signal at a second node, wherein the first and second output signals are of opposite phase so that the first output signal falls while the second output signal rises and the first output signal rises while the second output signal falls;

a charge sharing circuit connected between the first and second nodes, wherein the charge sharing circuit is active when either the first or second clock signal is falling;

a charge sharing circuit connected between the first and second output nodes, wherein the charge sharing circuit-connects the first and second output nodes when either the first or second output signal is falling;

a first clock driver circuit connected receive an input clock signal and generate therefrom the first and second clock signals;

a second clock driver circuit connected to receive the first and second clock signals and generate therefrom a third clock signal; and a clock boosting circuit connected to receive the third clock signal and generate therefrom a boosted form of third clock signal, wherein the charge sharing circuit is connected to receive the boosted form of the third clock signal and is active when the boosted form of the third clock signal is asserted.

2. The charge pump circuit of claim 1, wherein the first and second clock signals are non-overlapping and the third clock signal is high when both the first and second clock signals are low.

3. The charge pump circuit of claim 1, wherein clock boosting circuit has the structure of half of a voltage doubler-type circuit.

4. A method of operating a charge pump system, comprising:

receiving an input clock signal at a clock driver circuit and generating therefrom first and second non-overlapping pump clock signals of opposite phase;

receiving at a first leg of a charge pump the first of the pump clock signals generating from the first pump clock signal a first output waveform at a first node of the first leg;

receiving at a second leg of the charge pump the second of the pump clock signals generating from the second pump clock signal a second output waveform at a second node of the second leg, where the first and second waveforms are boosted versions of the input clock signal, the first and second waveforms being of opposite phase so that the first node discharges while the second node charges and the first node charges while the second node discharges; and wherein generating the first and second waveform includes transferring by a charge transfer circuit of charge between the first and second nodes when the first node charges and discharges, and wherein the charge transfer circuit is a switch controlled by a boosted version of the clock signal.

5. A method of operating a charge pump system, comprising:

receiving an input clock signal at a clock driver circuit and generating therefrom first and second non-overlapping pump clock signals of opposite phase;

receiving at a first leg of a charge pump the first of the pump clock signals generating from the first pump clock signal a first output waveform at a first node of the first leg;

receiving at a second leg of the charge pump the second of the pump clock signals generating from the second pump clock signal a second output waveform at a second node of the second leg, where the first and second waveforms are boosted versions of the input clock signal, the first and second waveforms being of opposite phase so that the first node discharges while the second node charges and the first node charges while the second node discharges; and wherein generating the first and second waveform includes transferring by a charge transfer circuit of charge between the first and second nodes when the first node charges and discharges, wherein, when discharging, each of the nodes initially discharge from the high value of the output wave forms to an intermediate value, then subsequently discharge to the low value of the output waveforms, and when charging, the nodes initially charge from the low value of the output wave forms to the intermediate value, then subsequently charge to the high value of the output waveforms, wherein charge is transferred from the first node to the second node when the first node is discharged from the high value to the intermediate value and charge is transferred to the first node from the second node when the first node is charged from the low value to the intermediate value, wherein the intermediate value is substantially equal to the supply voltage value and the high value is substantially equal to twice the supply voltage value, and wherein the charge is transferred from the first node to the second node using switch controlled by a boosted version of the clock signal.

6. The method of claim 5, wherein the boosted version of the clock signal has an amplitude substantially equal to twice the supply voltage value.

7. A charge pump circuit, comprising:

a boosting section having a first branch receiving a first clock signal and providing a first output signal at a first output node and a second branch receiving a second clock signal and providing a second output signal at a second node, wherein the first and second clock signals are non-overlapping and of opposite phase so that the first clock signal is low when the second clock signal is high and the second clock signal is low when the first clock signal is high and include non-overlapping intervals when both the first and second-clock signals are low;

a charge sharing circuit connected between the first and second output nodes, wherein the charge sharing circuit connects the first and second output nodes during the non-overlapping intervals when both the first and second-clock signals are low;

a first clock driver circuit connected receive an input clock signal and generate therefrom the first and second clock signals;

a second clock driver circuit connected to receive the first and second clock signals and generate therefrom a third clock signal; and a clock boosting circuit connected to receive the third clock signal and generate therefrom a boosted form of third clock signal, wherein the charge sharing circuit is connected to receive the boosted form of the third clock signal and is active when the boosted form of the third clock signal is asserted.

8. The charge pump circuit of claim 7, wherein clock boosting circuit has the structure of half of a voltage doubler-type circuit.

* * * * *